(No Model.)
2 Sheets—Sheet 1.

J. W. HAGGERTY.
AUTOMATIC GAS PRESSURE REGULATOR.

No. 367,618. Patented Aug. 2, 1887.

Witnesses,
Geo. H. Strong.
J. H. Andree.

Inventor,
J. W. Haggerty,
By Dewey & Co.
Attys (No Model.) 2 Sheets—Sheet 2.

J. W. HAGGERTY.
AUTOMATIC GAS PRESSURE REGULATOR.

No. 367,618. Patented Aug. 2, 1887.

Witnesses,
Geo. H. Strong.
J. H. Rouse.

Inventor,
J. W. Haggerty
By Dewey & Co.
Attys

UNITED STATES PATENT OFFICE.

JAMES W. HAGGERTY, OF SAN FRANCISCO, CALIFORNIA, ASSIGNOR TO CHARLES C. MORRIS, OF SAME PLACE.

AUTOMATIC GAS-PRESSURE REGULATOR.

SPECIFICATION forming part of Letters Patent No. 367,618, dated August 2, 1887.

Application filed April 2, 1887. Serial No. 233,462. (No model.)

*To all whom it may concern:*

Be it known that I, JAMES W. HAGGERTY, of the city and county of San Francisco, State of California, have invented an Improvement in Automatic Gas-Pressure Regulators; and I hereby declare the following to be a full, clear, and exact description of the same.

My invention relates to an automatic gas-pressure regulator which is especially applicable to liquids, such as beer, in which it is desirable to retain a certain amount of carbonic-acid gas and to maintain a regular pressure within the cask or receptacle while the liquid itself is gradually diminished by being drawn off.

My invention consists of a chamber into which the gas is delivered under a high pressure through a peculiar valve, and a mechanism within the chamber by which this pressure is reduced before it enters the cask or receptacle, and by which the flow is arrested when the pressure in the cask reaches a certain point and commences again if it falls below that point.

Figure 1:
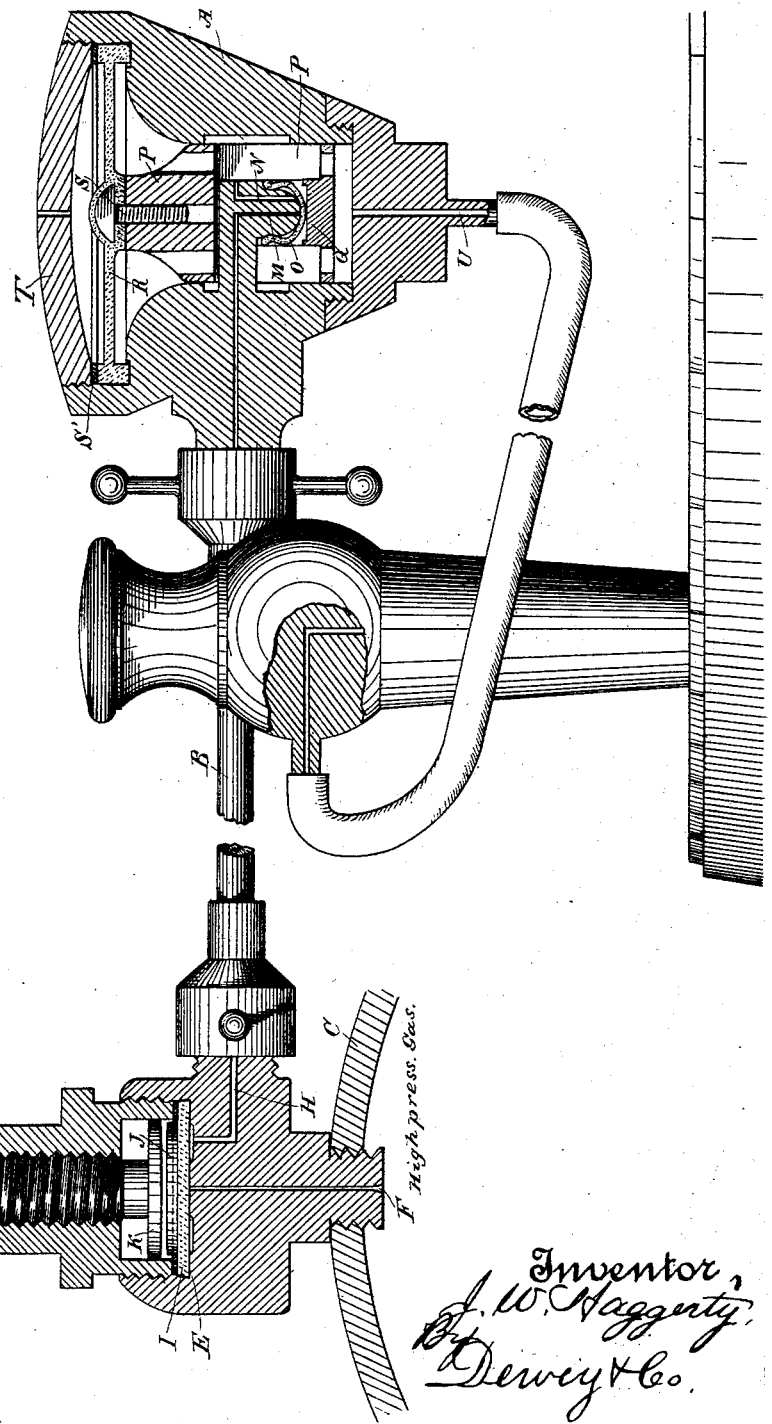
Figure 2:
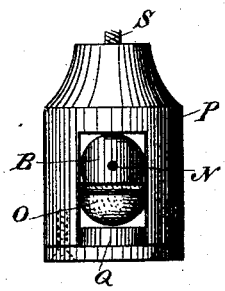
Figure 3:
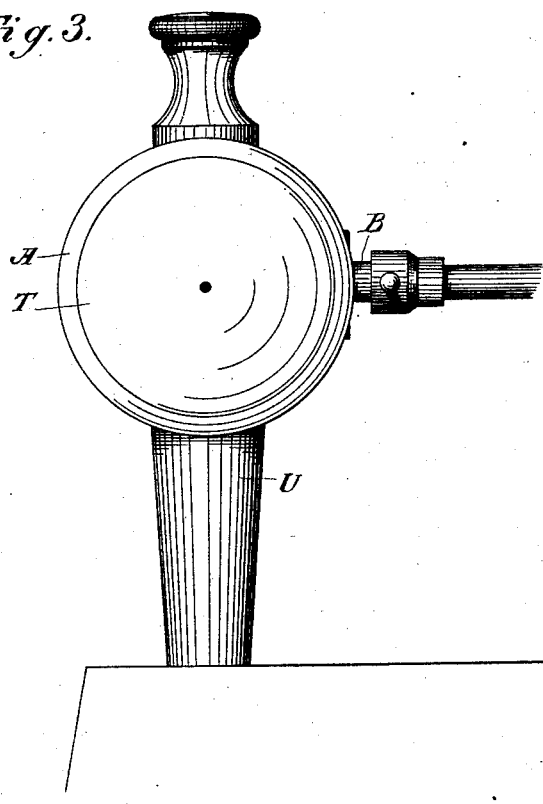

Referring to the accompanying drawings for a more complete explanation of my invention, Figure 1 is a longitudinal vertical section of my device. Fig. 2 is a detail view of the valve. Fig. 3 is a modification of my device, showing the chamber in direct connection with a vessel.

A is a chamber, which may be made of any suitable or desirable shape. In the present case it is shown as conical in form. To one side of this chamber a pipe, B, has one end connected, and the other is connected with a supply chamber or holder, C, which is filled with the gas at a high pressure from the generator. Between the holder C and the pipe B is a valve-chamber, E, into the bottom of which a hole or passage, F, leads from the holder. This small opening is in the present case shown passing up through the center of the floor or bottom of the valve-chamber, and at one side and through the same floor or bottom is another passage, H, which opens into the pipe B. A rubber valve or gasket, I, is fitted into the chamber and lies upon the floor or bottom of the valve-chamber, so as to cover both the openings or passages just described, and a metal ring or washer fits around the outer edge of the elastic valve. Upon the center of this valve is placed a disk, J, and a similar disk, K, at the end of the screw-shank L, presses upon this disk when screwed down, thus forcing the elastic valve down closely upon the passage or opening to close it.

When it is desired to allow the gas to pass from the holder C through the pipe B into the chamber A, the screw stem and disk are turned, so as to withdraw them, by means of a suitable hand-wheel, and the pressure of the gas will raise the valve sufficiently to allow it to pass from the opening or passage F to the opening or passage H, and thence through the pipe B into the chamber A. Within the chamber A the end of the pipe B is shown turned at right angles and having a minute opening, M, through the center of the closed end, this opening M not being more than one sixty-fourth of an inch in diameter. By the side of this opening M is another opening, N, which passes down through the solid part and opens out into the body of the chamber A. A rubber or other elastic cap or valve, O, fits over the end of this chamber, and when pressed down closely covers the inlet-opening and closes it in the same manner as has been described for the valve I.

Within the chamber A is a connecting-piece, P, which is here shown slotted, so as to fit astride the end of the pipe B, which projects into the chamber and has the openings M and N, and upon one end of this piece is a cap, Q, which fits against the outer end of the elastic cap or valve O.

To the opposite end of the piston P is fitted an elastic diaphragm, R. In the present case I have shown this diaphragm as being made of such a diameter as to give about four inches of area, the chamber being enlarged, as shown, at this point so as to receive the diaphragm. A screw, S, is fitted into the center of the diaphragm, being preferably cast into it when the diaphragm is formed, and this screw serves to secure its center to the end of the piston P. Upon the outer periphery of this diaphragm a washer, S', fits, and the screw-cap T, being screwed into this end of the chamber A, presses upon the washer, and thus holds the periphery of the diaphragm firmly to its seat and makes it gas-tight. A small hole through T allows the air outside the diaphragm to move freely as the diaphragm is forced out or in. A passage, U, leads from that portion of the chamber A containing the valve or cap O into the cask or receptacle in which the pressure is to be maintained.

It will be manifest that the pressure of five hundred pounds or its equivalent high pressure through the small opening of one sixty-fourth of an inch in the inlet-pipe will be counterbalanced by a pressure of five pounds, more or less, upon the diaphragm R, which has a greater area, as before described. When the pressure within the cask exceeds the desired amount of five pounds, it will act upon the diaphragm, forcing it outwardly and drawing with it the movable connection P, which causes the cap Q upon its end to press upon the elastic cap or valve O, and this closes the small inlet-passage M and prevents any gas entering from the holder C. As soon, however, as the pressure within the cask falls below five pounds or other determined pressure, the force of the gas passing through the small opening M will act, through the rubber cap or valve O, to force the bar P in the opposite direction, and this permits the cap to rise from its seat sufficiently to allow the gas to flow from the inlet-opening M through the passage N into the chamber A, and thence through the passage U into the cask until an equilibrium of pressure is again reached. In this manner the counterbalancing action of the high pressure through the inlet-opening M, and the smaller pressure within the cask acting upon the elastic diaphragm, will cause the connecting device or bar to move back and forward, and thus open and close the inlet-valve with each variation in pressure. In this way it is possible to maintain a certain pressure within the cask or receptacle until all the liquid has been exhausted therefrom.

It will be manifest that the automatic valves may be arranged in various equivalent ways to that here shown and described, and that the arrangement of the interior of the chamber A and the connections may be varied mechanically without essentially altering the character and operation of the device.

Having thus described my invention, what I claim as new, and desire to secure by Letters Patent, is—

1. An automatic gas-pressure regulator consisting of a chamber, a nozzle therein provided with an inlet-opening for the gas and an outlet-opening for the escape of the gas, in connection with the interior of the chamber, an elastic cap covering the inlet-opening and connecting the same with the outlet-opening, a diaphragm in the upper part of the chamber, a piston, P, connected with said diaphragm and adapted to move therewith, and a cap, Q, connected to the said piston, arranged beneath the elastic cap and adapted to close the inlet-opening by pressing the cap against the same in the upward movement of the diaphragm when there is an excess of pressure in the keg or other receptacle, substantially as described.

2. In a gas-pressure regulator, a gas supply and regulating chamber connected with the receptacle in which the pressure is to be maintained, a pipe-connection between said chamber and the gas-supply, terminating in a nozzle in said chamber, provided with an inlet-opening and an outlet-opening to the interior of the chamber, a rubber cap covering said openings, a diaphragm arranged in the upper part of the chamber, an opening in the chamber above the diaphragm adapted to allow free movement thereof under pressure from below, a piston, P, connected with said diaphragm, and a cap, Q, connected with the said piston and adapted to be operated by the action of the diaphragm under pressure to close the inlet-opening by pressure applied to the elastic cap, substantially as described.

In witness whereof I have hereunto set my hand.

JAMES W. HAGGERTY.

Witnesses:
S. H. NOURSE,
H. C. LEE.